United States Patent
Beaujour et al.

(10) Patent No.: US 9,183,865 B1
(45) Date of Patent: Nov. 10, 2015

(54) PATTERNED PERPENDICULAR MAGNETIC RECORDING MEDIUM WITH ULTRATHIN NOBLE METAL INTERLAYER

(71) Applicant: HGST Netherlands B.V., Amsterdam (NL)

(72) Inventors: Jean-Marc L. Beaujour, San Jose, CA (US); Bruce Alvin Gurney, San Jose, CA (US); Chu Sy Tran, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 30 days.

(21) Appl. No.: 14/255,752

(22) Filed: Apr. 17, 2014

(51) Int. Cl.
*G11B 5/74* (2006.01)
*G11B 5/66* (2006.01)
*G11B 3/70* (2006.01)
*G11B 5/738* (2006.01)

(52) U.S. Cl.
CPC . *G11B 5/738* (2013.01); *G11B 5/66* (2013.01)

(58) Field of Classification Search
CPC ........ G11B 5/313; G11B 5/3163; G11B 5/82; G11B 5/743; G11B 5/1278; G11B 5/3116; G11B 19/2009; G11B 19/20; G11B 2005/0021; G11B 5/7325; G11B 5/732; G11B 5/3903; G11B 5/66
USPC ........ 360/131, 135, 125.02, 125.03; 369/288, 369/13.33; 428/815, 828, 810, 831, 826
See application file for complete search history.

(56) References Cited

U.S. PATENT DOCUMENTS

| 6,468,670 B1 | 10/2002 | Ikeda et al. |
| 7,101,634 B2 | 9/2006 | Lee et al. |
| 7,713,389 B2 | 5/2010 | Marinero |
| 8,206,778 B2 * | 6/2012 | Tsuda ........................ 427/126.1 |
| 8,268,461 B1 | 9/2012 | Hellwig et al. |
| 2013/0270221 A1 | 10/2013 | Grobis et al. |

OTHER PUBLICATIONS

Y. Yamada, W.P. Van Drent, E.N. Abarra, and T. Suzuki, High perpendicular anisotropy and magneto-optical activities in ordered Co3Pt alloy films, J. Appl. Phys. 83, 6527 (1998).
P. F. Garcia, A. D. Meinhaldt and A. Suna, Perpendicular Magnetic Anisotropy in Pd/Co Thin Film Layered Structures,, Appl. Phys. Lett., vol. 47, pp. 178-180 (1985).

(Continued)

*Primary Examiner* — Nabil Hindi
(74) *Attorney, Agent, or Firm* — Thomas R. Berthold

(57) ABSTRACT

A bit-patterned media (BPM) magnetic recording disk has a cobalt (Co) alloy recording layer (RL), a ruthenium (Ru) containing underlayer (UL), and a noble metal film (NMF) as an interlayer between the RL and the UL. The RL is preferably oxide-free and is a Co alloy, like a CoPtCr alloy, with a hexagonal-close-packed (hcp) crystalline structure with its c-axis oriented substantially perpendicular to the plane of the RL. The NMF is an element from the Pt group (Pt, Pd, Rh, Ir) and Au, or an alloy of two or more of these elements, and has a thickness less than 3.0 nm, preferably between 0.3 and 1.0 nm. The NMF does not interrupt the epitaxial growth of the RL and has little to no effect on the distribution of the RL c-axis orientation. The NMF increases the coercivity (Hc) and perpendicular magnetic anisotropy constant ($K_u$) of the RL.

18 Claims, 8 Drawing Sheets

(56) References Cited

OTHER PUBLICATIONS

M. T. Johnson, P. J. H. Bloemen, F. J. A. den Broeder and J. J. de Vries, Magnetic anisotropy in metallic multilayers, Rep. Prog. Phys 59 (1999) 1409-1458.

Shigeru Shiomi, Hironori Okazawa, Tomoki Nakakita, Tadashi Kobayashi and Morio Masuda, Magnetic properties of CoPt alloy films sputtered on Pt underlayers, Jpn J. Appl. Phys., vol. 32, No. 3A, pp. L315-L317 (1993).

Fu-Te Yuan, An-Cheng Sun and Jen-Hwa Hsu, Effect of underlayer (Pt, Ru, Au, Ag) on L11 ordering in sputtered CoPt thin films, , Scripta Materialia 62 (2010) 762-765.

Atsushi Sato, Shigeki Nakagawa and Masahiko Naoe, Co—Cr—Ta perpendicular magnetic recording media using Pt seed layer, IEEE Trans. Magn. vol. 36, No. 5 (2005), pp. 2387.

* cited by examiner

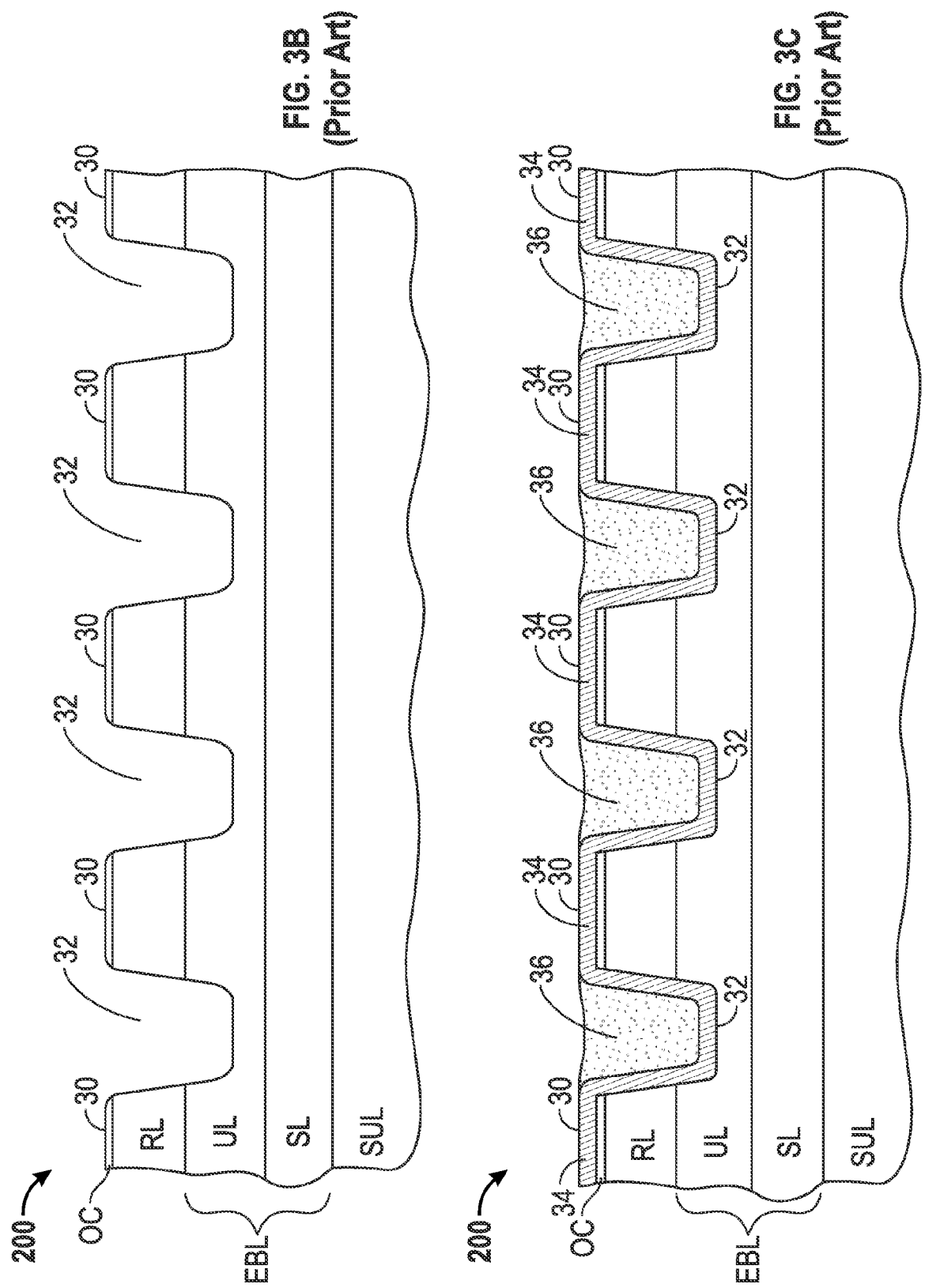

PATTERNED PERPENDICULAR MAGNETIC RECORDING MEDIUM WITH ULTRATHIN NOBLE METAL INTERLAYER

BACKGROUND OF THE INVENTION

1. Field of the Invention

This invention relates generally to patterned perpendicular magnetic recording media, such as disks for use in magnetic recording hard disk drives, and more particularly to patterned disks with data islands having improved magnetic recording properties.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned media (BPM), the magnetic recording layer on the disk is patterned into small isolated data islands arranged in concentric data tracks. While BPM disks may be longitudinal magnetic recording disks, wherein the magnetization directions are parallel to or in the plane of the recording layer, perpendicular magnetic recording disks, wherein the magnetization directions are perpendicular to or out-of-the-plane of the recording layer, will likely be the choice for BPM because of the increased data density potential of perpendicular media. To produce the magnetic isolation of the patterned data islands, the magnetic moment of the spaces between the islands is destroyed or substantially reduced to render these spaces essentially nonmagnetic. Alternatively, the media may be fabricated so that there is no magnetic material in the spaces between the islands.

Nanoimprint lithography (NIL) has been proposed to form the desired pattern of islands on BPM disks. NIL is based on deforming an imprint resist layer by a master template or mold having the desired nano-scale pattern. The master template is made by a high-resolution lithography tool, such as an electron-beam tool. The substrate to be patterned may be a disk blank with the magnetic recording layer, and any required underlayers, formed on it as continuous layers. Then the substrate is spin-coated with the imprint resist, such as a thermoplastic polymer, like poly-methylmethacrylate (PMMA). The polymer is then heated above its glass transition temperature. At that temperature, the thermoplastic resist becomes viscous and the nano-scale pattern is reproduced on the imprint resist by imprinting from the template at a relatively high pressure. Once the polymer is cooled, the template is removed from the imprint resist leaving an inverse nano-scale pattern of recesses and spaces on the imprint resist. As an alternative to thermal curing of a thermoplastic polymer, a polymer curable by ultraviolet (UV) light, such as MonoMat available from Molecular Imprints, Inc., can be used as the imprint resist. The patterned imprint resist layer is then used as an etch mask to form the desired pattern of islands in the underlying magnetic recording layer.

In BPM, data are stored in an array of single-domain magnetic islands. The magnetic islands are required to have high coercivity (Hc) and be magnetically stable at room temperature. The figure of merit for the thermal stability of a magnetic island is given by the ratio $(K_u V/k_B T)$ where $K_u$ is the perpendicular magnetic anisotropy constant, V is the magnetic volume of the island, kB is the Boltzmann constant and T is the temperature. The contributions to $K_u$ may include magneto-crystalline anisotropy and surface/interface induced magnetic anisotropy. The magnetic islands are considered thermally stable when $(K_u V/kBT)$ is typically above 80.

However, to provide higher bit areal density the magnetic islands lateral dimensions need to be smaller which leads to a lowering of V and thus a reduction in thermal stability. To compensate for the loss in V with higher areal density, $K_u$ must be increased. In the case of a CoPtCr alloy magnetic material, increasing the Pt content and/or decreasing the Cr content can achieve higher Ku. In addition to high Hc and thermal stability the magnetic islands are also required to have a narrow intrinsic switching field distribution (iSFD), i.e., the island-to-island variation of the coercive field needs to be narrow enough to insure exact addressability of individual islands without overwriting adjacent islands. However, higher Pt content (e.g., greater than about 20 at %) leads to more stacking faults/defects and face-centered-cubic (fcc) phases, which affects the RL rocking angle, i.e., the angle of the c-axis of the hexagonal-close-packed (hcp) crystalline structure relative to the preferred perpendicular orientation, which is detrimental to a narrow iSFD. Also, lower Cr content can cause an increase in saturation magnetization, and therefore the magnetostatic energy is enhanced.

What is needed is a patterned perpendicular magnetic recording medium that has high Hc and $K_u$ without the adverse effects on magnetic properties such as those caused by varying the amounts of Pt and Cr.

SUMMARY OF THE INVENTION

Embodiments of the invention relate to a bit-patterned media (BPM) magnetic recording disk with a cobalt (Co) alloy recording layer (RL) and a ruthenium (Ru) containing underlayer (UL). The RL is preferably oxide-free and is a Co alloy, like a CoPtCr alloy, with a hcp crystalline structure with its c-axis oriented substantially perpendicular to the plane of the RL, so that the RL has strong perpendicular magnetocrystalline anisotropy. A noble metal film (NMF) made of one or more noble metals is located as an interlayer between the RL and the UL. The NMF is an element from the Pt group (Pt, Pd, Rh, Ir) and Au, or an alloy of two or more of these elements, and has a thickness less than 3.0 nm, preferably between 0.3 and 1.0 nm. The NMF has a fcc crystalline structure and is grown on top of the Ru-containing UL with the (111) plane normal to the layer growth direction. The epitaxial growth of the RL is not interrupted by the NMF, and the NMF has little to no effect on the distribution of the RL c-axis orientation, i.e., its rocking angle. In the thickness regime of less than about 1.0 nm, the thickness may be considered an "average" thickness of a discontinuous film, so that the surface onto which the Co-alloy RL is deposited may be both the Ru or Ru alloy material of the UL and clusters or regions of the NMF. The NMF results in a substantial increase in the coercivity (Hc) and perpendicular magnetic anisotropy constant $(K_u)$ of the RL.

The BPM disk with the NMF interlayer may also include an optional ultrathin oxide film between and in contact with the NMF and the RL. The magnetic properties of the BPM disk can be further enhanced by a post-etch in-vacuum annealing process.

For a fuller understanding of the nature and advantages of the present invention, reference should be made to the following detailed description taken together with the accompanying figures.

BRIEF DESCRIPTION OF THE DRAWING

FIGS. 3A-3C are sectional views of a BPM disk at various stages of etching and planarizing the disk according to the prior art.

DETAILED DESCRIPTION OF THE INVENTION

Figure 1:
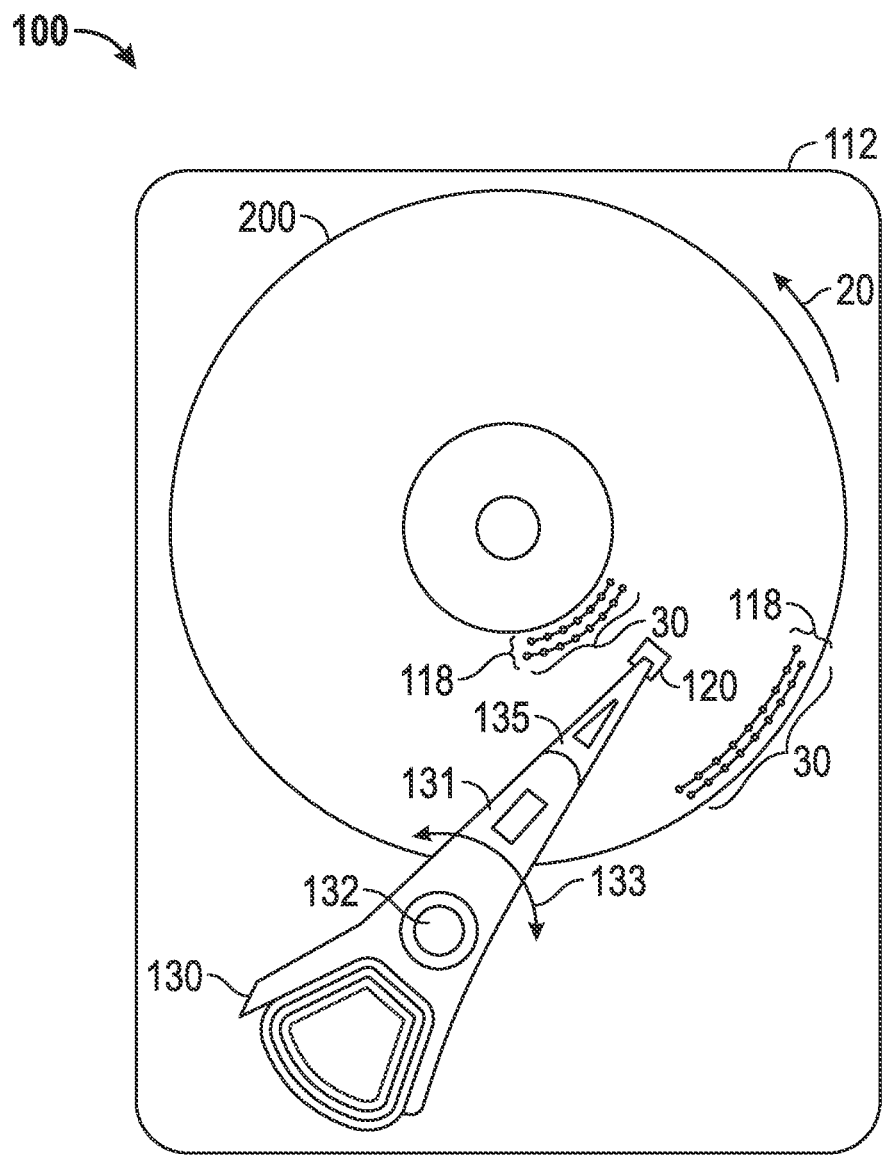
FIG. 1 is a top view of a perpendicular magnetic recording disk drive with bit-patterned media (BPM) and shows the patterned data islands arranged in concentric circular data tracks according to the prior art.

FIG. 1 is a top view of a patterned-media magnetic recording disk drive 100 with a patterned-media magnetic recording disk 200. The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 200 includes a hard or rigid disk substrate and discrete data islands 30 of magnetizable material on the substrate. The data islands 30 are arranged in radially-spaced circular tracks 118, with only a few islands 30 and representative tracks 118 near the inner and outer diameters of disk 200 being shown in FIG. 1. The islands 30 are depicted as having a circular shape but the islands may have other shapes, for example generally rectangular, oval or elliptical. As the disk 200 rotates in the direction of arrow 20, the movement of actuator 130 allows the read/write head on the trailing end of slider 120 to access different data tracks 118 on disk 200.

Figure 2:
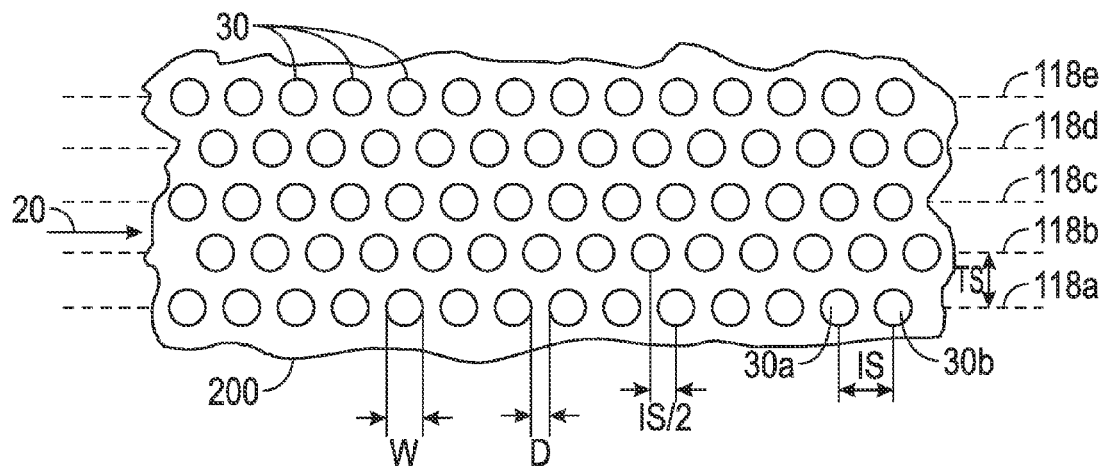
FIG. 2 is a top view of an enlarged portion of a prior art BPM disk showing the detailed arrangement of the data islands.

FIG. 2 is a top view of an enlarged portion of disk 200 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b. Each island has a lateral dimension W parallel to the plane of the disk 200, with W being the diameter if the islands have a circular shape. The islands may have other shapes, for example generally rectangular, oval or elliptical, in which case the dimension W may be considered to be the smallest dimension of the non-circular island, such as the smaller side of a rectangular island. Nonmagnetic regions or spaces, with the spaces having a lateral dimension D, separate the adjacent islands. The value of D may be greater than the value of W. As is apparent from FIG. 2, a decrease in D and W will result in an increase in areal density of the islands. However, a decrease in W will also result in a decrease in the magnetic volume V of the islands, and thus a reduction in thermal stability.

BPM disks like that shown in FIG. 2 may be perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a non-ferromagnetic material, such as a dielectric, or a material that has no substantial remanent moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3A:
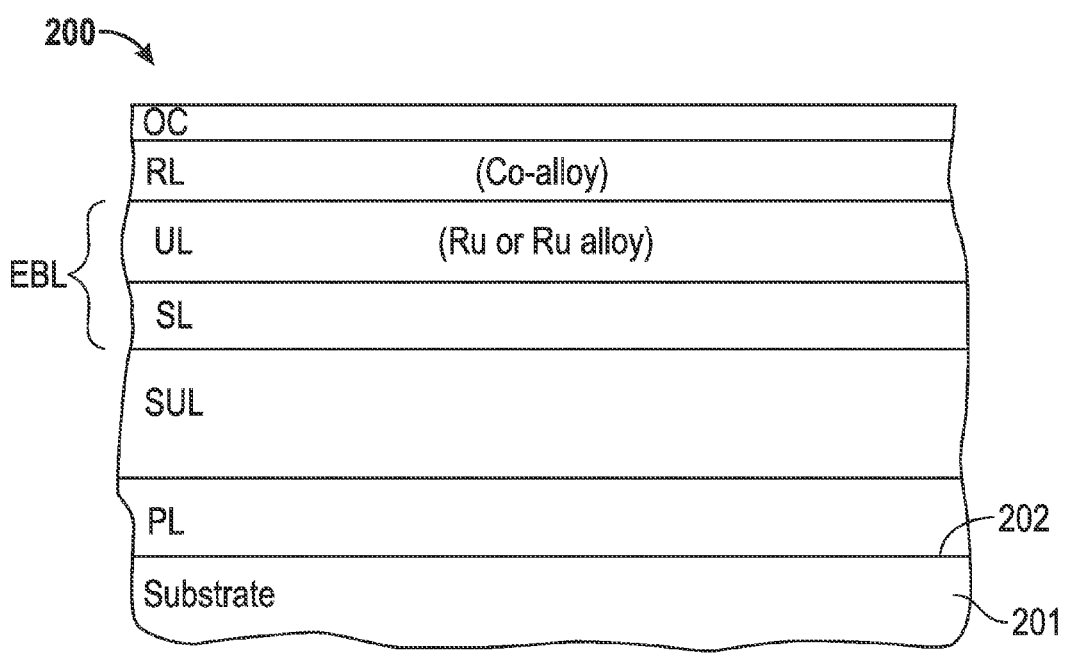

FIG. 3A is a sectional view showing the disk 200 according to the prior art before lithographic patterning and etching to form the BPM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. If the substrate is glass a planarizing layer (PL), such as a layer of NiTa, may be formed on the substrate surface 202 prior to the deposition of the SUL.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

The RL in the discrete magnetic islands may be a cobalt (Co) alloy, like a cobalt-platinum (CoPt) or cobalt-platinum-chromium (CoPtCr) alloy. The Co alloy RL is grown on a growth-enhancing underlayer (UL) that induces the crystalline c-axis of the Co alloy to be perpendicular to the plane of the RL, so that the RL has strong perpendicular magnetocrystalline anisotropy. The UL may be a Ru or Ru alloy layer. A seed layer (SL), like a NiTa, NiW or NiWCr alloy layer, may be deposited on the SUL to enhance the growth of the Ru-containing UL. If the optional SUL is present, then the UL and SL also function as an exchange-break layer (EBL) that breaks the magnetic exchange coupling between the magnetically permeable films of the SUL and the RL.

A protective overcoat (OC) is deposited on the RL. The OC may be sputter-deposited amorphous carbon, like DLC, which may also be hydrogenated and/or nitrogenated. Other materials that may be used for the OC include carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta2O_5$ and $ZrO_2$—$Y_2O_3$; and mixtures of these materials.

The disk of FIG. 3A is lithographically patterned, for example by a nanoimprinting process. In nanoimprinting, a master template is fabricated, for example by direct e-beam writing, to have the desired pattern of data islands and nonmagnetic regions. A thin film of imprint resist (i.e., a thermoplastic polymer) is spin coated onto the disk. Then the master template with its predefined pattern is brought into contact with the imprint resist film and the template and disk are pressed together and heat is applied. When the imprint resist polymer is heated above its glass transition temperature, the pattern on the template is pressed into the resist film. After cooling, the master template is separated from the disk and the patterned resist is left on the RL. The patterned imprint resist is then used as an etch mask. Reactive-ion-etching (RIE) or ion milling can be used to transfer the pattern in the imprint resist to the underlying disk to form the data islands and nonmagnetic regions.

FIG. 3B is a sectional view of the disk 200 after lithographic patterning and etching. After etching, elevated lands 30 with RL material and grooves or recesses 32 are formed above the substrate surface 202. The typical depth of the recesses 32, which is also essentially the height of the lands 30, is in the range of about 4 to 50 nm and the typical width of the recesses is in the range of about 4 to 50 nm. As shown in FIG. 3B, the etching is preferably performed to a depth that removes all of the RL material so that there is no RL material in the recesses 32. The etching may remove a small amount of the EBL material. Typically there would be a layer of EBL material below the lower surface of the recesses 32.

FIG. 3C is a sectional view of the etched disk 200 of FIG. 3B after deposition of a second optional protective overcoat 34 into the recesses 32 and over the tops of lands 30 and after deposition and chemical-mechanical-polishing (CMP) of fill material 36 in the recesses 32. The optional second protective overcoat 34 may be formed of one of the materials like that used for the OC directly on top of the RL. The fill material 36 may be $SiO_2$ or a polymeric material, or a nonmagnetic metal, like Cu. The CMP results in essentially a planarized disk surface. A layer of conventional liquid lubricant (not shown) may be deposited, for example by spin coating, on the surface of the disk 200.

Figure 4:
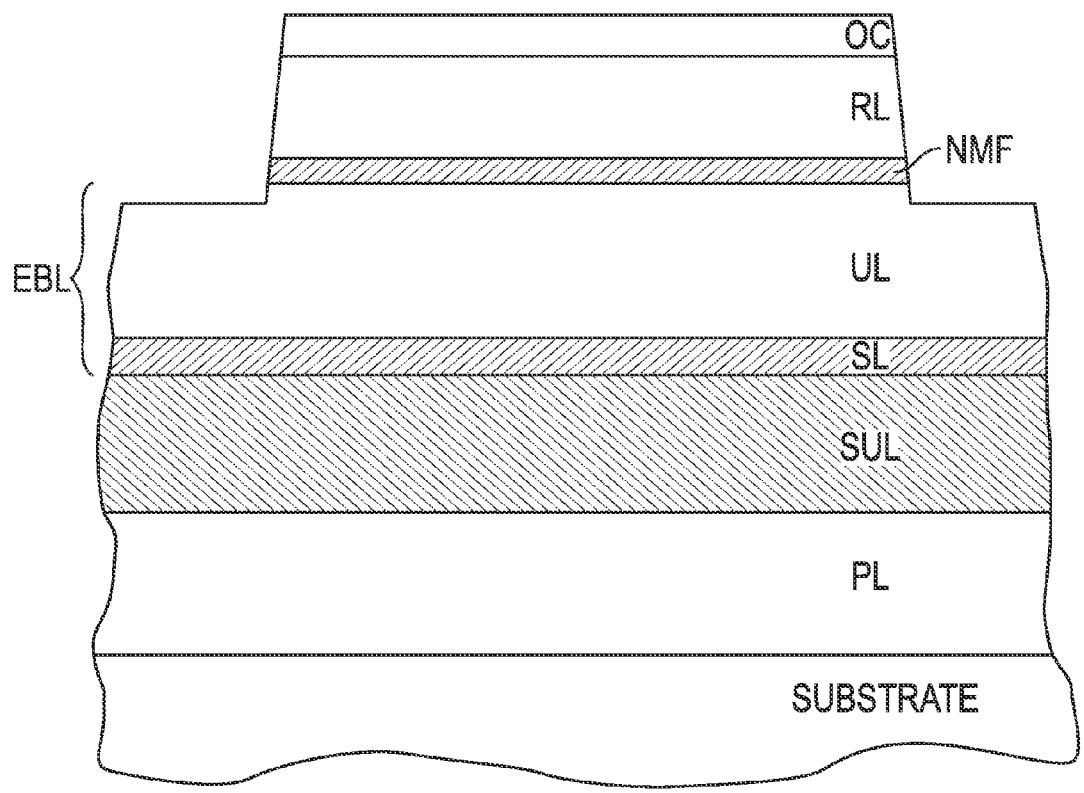
FIG. 4 is a sectional view of a portion of a disk showing a single data island with a noble metal film (NMF) as an interlayer between the recording layer (RL) and the underlayer (UL) according to an embodiment of the invention.

In embodiments of the patterned perpendicular media of this invention, an ultrathin noble metal film (NMF) made of one or more noble metals is located as an interlayer between the Ru-containing UL and the RL. FIG. 4 is a sectional view of a portion of a disk showing a single data island according to an embodiment of the invention. The PL is preferably a NiTa alloy, preferably a $Ni_xTa_{100-x}$, where x is in the range of about 50 to 70 atomic percent, with a thickness in the range of about 5 to 40 nm. The SUL is any of the conventional soft magnetic materials and may be a single layer or a lamination of multiple layers. The seed layer (SL) for the Ru-containing underlayer (UL) is deposited on the SUL. The SL may be a NiTa, NiW or NiWCr alloy, with a thickness in the range of about 2 to 20 nm. The UL is deposited on the SL. The UL is preferably Ru, but may be a Ru alloy like RuCr, nonmagnetic RuCo or Ru-doped with oxides such as $Ta_2O_5$, $SiO_2$ or $TiO_2$, with a thickness in the range of about 5 to 30 nm. The RL is a Co alloy, preferably a CoPtCr alloy, with a thickness in the range of about 4 to 15 nm. The Co alloy has a hexagonal-close-packed (hcp) crystalline structure with its c-axis oriented substantially perpendicular to the plane of the recording layer. While granular Co-alloy magnetic layers for conventional non-BPM magnetic recording disks typically include an oxide, like $SiO_2$, to decrease the grain size, in this invention it is preferable that the Co-alloy RL be oxide-free and has a grain size as large as possible. In FIG. 4 the disk has been etched down through a portion of the EBL, in which case the NMF is located within the islands. However, it is possible to control the etching to stop at the NMF or partially through the NMF, in which case a least a portion of the NMF would be located in the nonmagnetic regions or spaces between the islands.

In embodiments of this invention the NMF is made of one or more elements from the Pt group (Pt, Pd, Rh, Ir) and Au, i.e., one of these elements or alloys of two or more of those elements. The NMF has a thickness less than 3.0 nm, preferably between 0.3 and 1.0 nm. Typical alloys for the NMF may be, for example, PtIr or PtRh. The NMF has a face-centered-cubic (fcc) crystalline structure and grows on top of the UL with the (111) plane normal to the layer growth direction. The epitaxial growth of the RL is not interrupted by the NMF, and the NMF has little to no effect on the distribution of the RL c-axis orientation, i.e., its rocking angle. The NMF is ultrathin, less than or equal to 3.0 nm and preferably less than 1.0 nm. In this thickness regime, the thickness may be considered an "average" thickness of a discontinuous film, so that the surface onto which the Co-alloy RL is deposited may be both the Ru or Ru alloy material of the UL and clusters or regions of the NMF.

Figure 5:
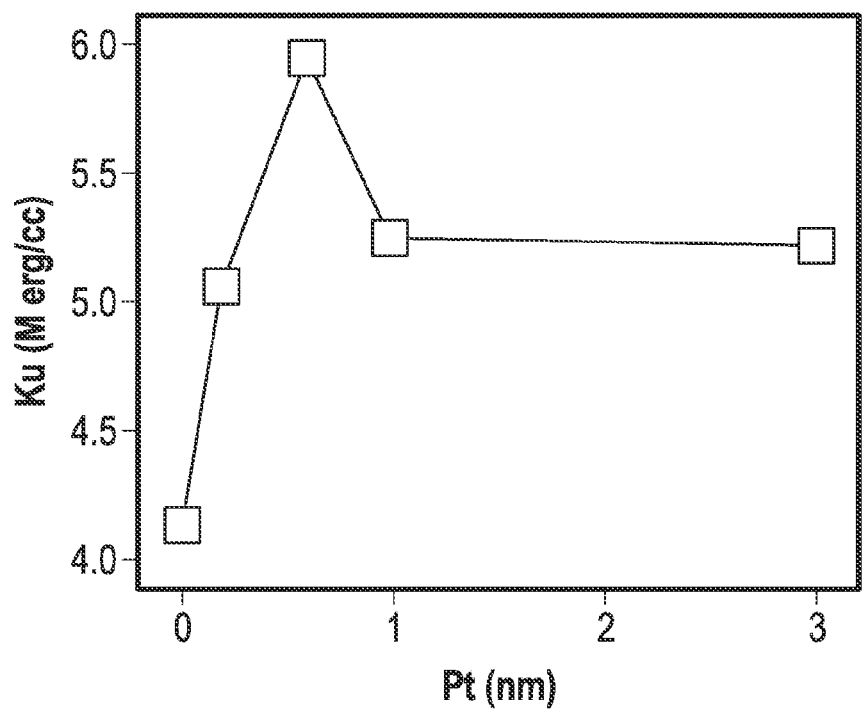
FIG. 5 is a graph of perpendicular magnetic anisotropy constant ($K_u$) as a function of Pt NMF thickness for an unpatterned layer stack with a Pt/CoCrPt interface according to embodiments of the invention.

The interface between the NMF and the RL contributes to the enhancement of the total $K_u$ of the RL. FIG. 5 is a graph showing $K_u$ versus the Pt NMF thickness for an unpatterned layer stack with a Pt/CoCrPt interface, wherein the RL magnetic alloy is 4 nm thick $CoPt_{10}Cr_{10}$, where the subscripts represent atomic percent (at.%). $K_u$ is determined from torque magnetometry measurements and the analysis takes into account only the first order $K_u$ constant. $K_u$ shows a non-monotonic dependence with Pt layer thickness, and a maximum value for Pt thicknesses below 1.0 nm.

The coercive field Hc and the thermal stability of a series of patterned media that integrates a $Pt/CoCr_{10}Pt_{10}$ structure were measured based on polar Kerr measurements. The Pt thickness was varied from 0 to 3.0 nm. The graphs of Hc (FIG. 6) and $K_u V/k_B T$ (FIG. 7) show a non-monotonic dependence with Pt layer thickness. When the Pt thickness is greater than 1.0 nm and up to 3.0 nm, Hc increases by about 20% compared to the media without a Pt NMF between the Ru-containing layer and the RL. However, when the Pt thickness is below 1.0 nm, Hc reaches a maximum value with an additional approximate 20% enhancement when compared to Hc of media with thicker Pt. The thermal stability $K_u V/k_B T$ increases from 120 to a maximum of 160 at intermediate Pt thickness below 1.0 nm, and then decreases to a constant value for greater Pt thicknesses.

Figure 6:
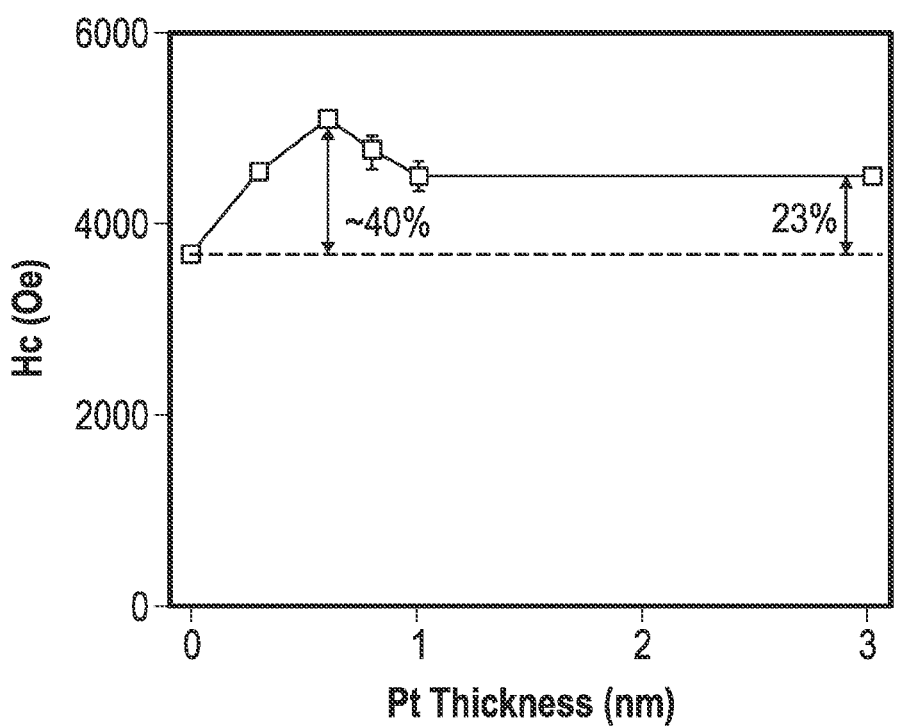
FIG. 6 is a graph of coercivity (Hc) as a function of Pt NMF thickness for a series of BPM disks with a Pt/CoCrPt interface according to embodiments of the invention.
Figure 7:
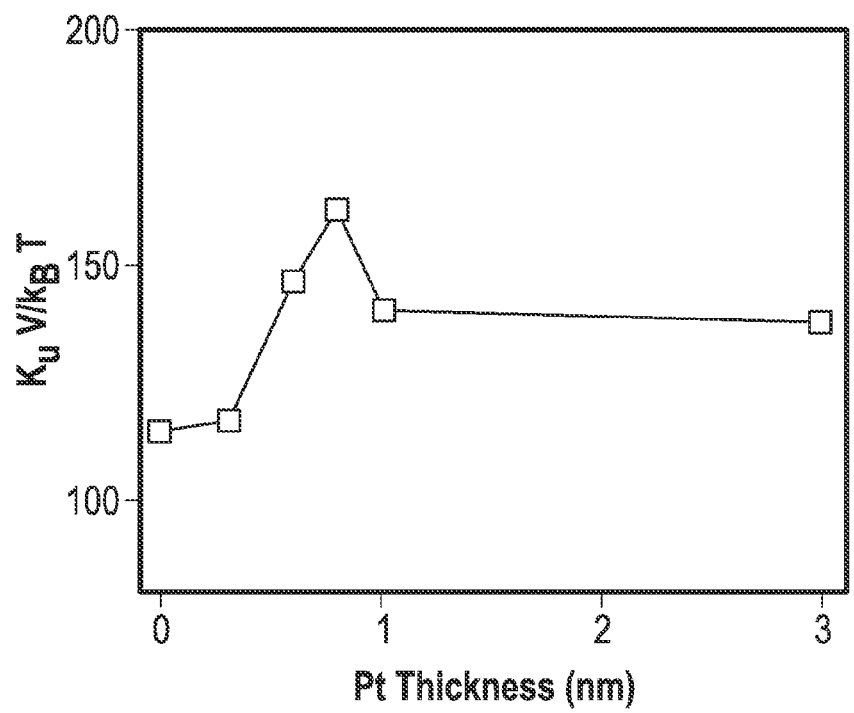
FIG. 7 is a graph of thermal stability figure of merit ($K_u V / k_B T$) as a function of Pt NMF thickness for a series of BPM disks with a Pt/CoCrPt interface according to embodiments of the invention.

The data from FIGS. 5-7 shows that the magnetic properties for BPM with a CoPtCr alloy RL can be improved without altering the CoPtCr composition. Thus the width W of the islands and the spacing D between the islands (see FIG. 2) can be decreased to increase the areal density of the islands. While this will reduce the magnetic volume V of the islands, the resulting reduction in thermal stability ($K_u V/k_B T$) can be compensated by increasing $K_u$ with the NMF/RL interface according to embodiments of the invention.

Co-alloy magnetic recording media have been proposed with thick Pt seed layers, but this media is for granular non-BPM media typically containing oxide segregants and for Pt seed layer thicknesses greater than 10 nm. In contrast, as shown by FIGS. 5-7, in embodiments of this invention, the ultrathin Pt NMF in the discrete magnetic islands of oxide-free CoPtCr unexpectedly enhance $K_u$ and Hc above the values achieved for Pt thicknesses greater than 1.0 nm.

Figure 8:
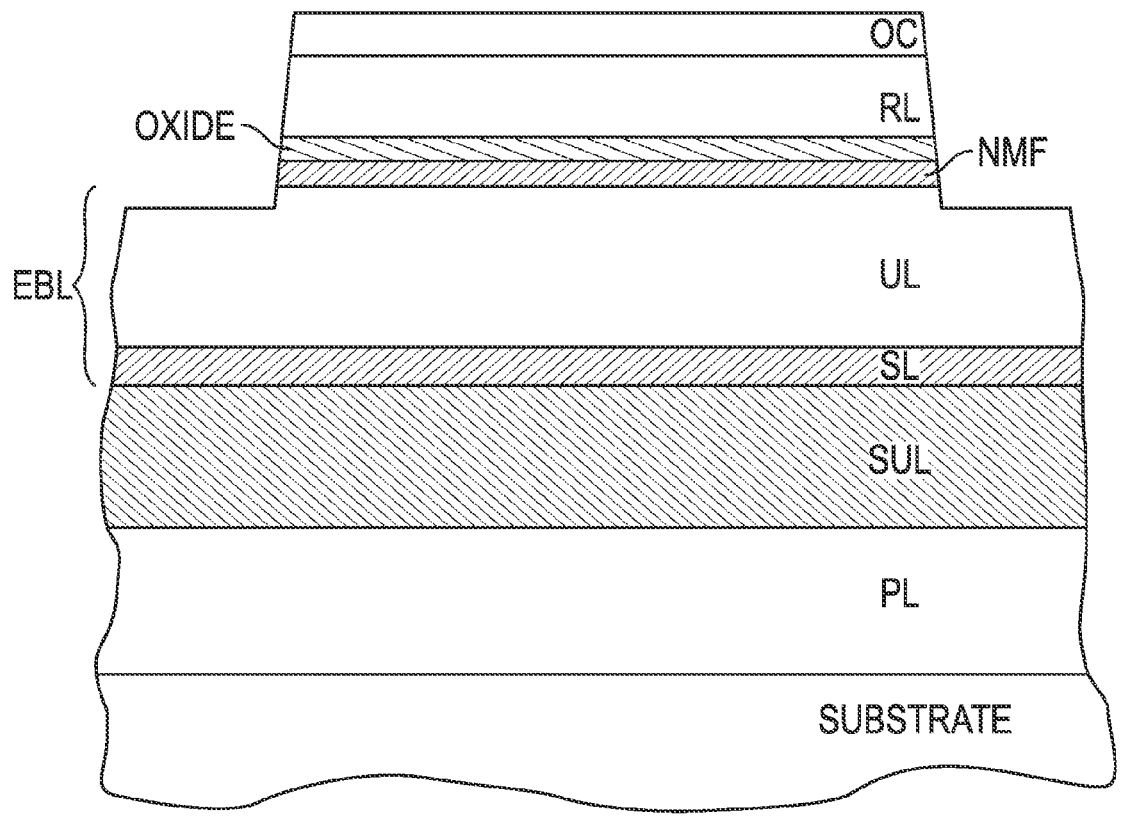
FIG. 8 is a sectional view of a portion of a disk showing a single data island with an optional ultrathin oxide film according to an embodiment of the invention.

Embodiments of the invention may also include an optional ultrathin oxide film, as shown in the sectional view of a single data island in FIG. 8. The oxide film may be between and in contact with the NMF and the RL, or alternatively between and in contact with the Ru-containing UL and the NMF. The oxide film is preferably a Ta-oxide, like $Ta_2O_5$, but may also be a Ti-oxide or a Co-oxide, with a thickness in the range of about 0.1 to 1.5 nm. The oxide film is ultrathin, less than or equal to 1.5 nm, and preferably less than or equal to 1.0 nm. In this thickness regime, the thickness may be considered an "average" thickness of a discontinuous film, so that the surface onto which the Co-alloy RL is deposited may be both the material of the NMF and clusters or regions of the oxide film. U.S. Pat. No. 8,268,461 B1, assigned to the same assignee as this application, describes a BPM disk with an ultrathin oxide film between the RL and the Ru-containing UL for reduced iSFD.

Figure 9:
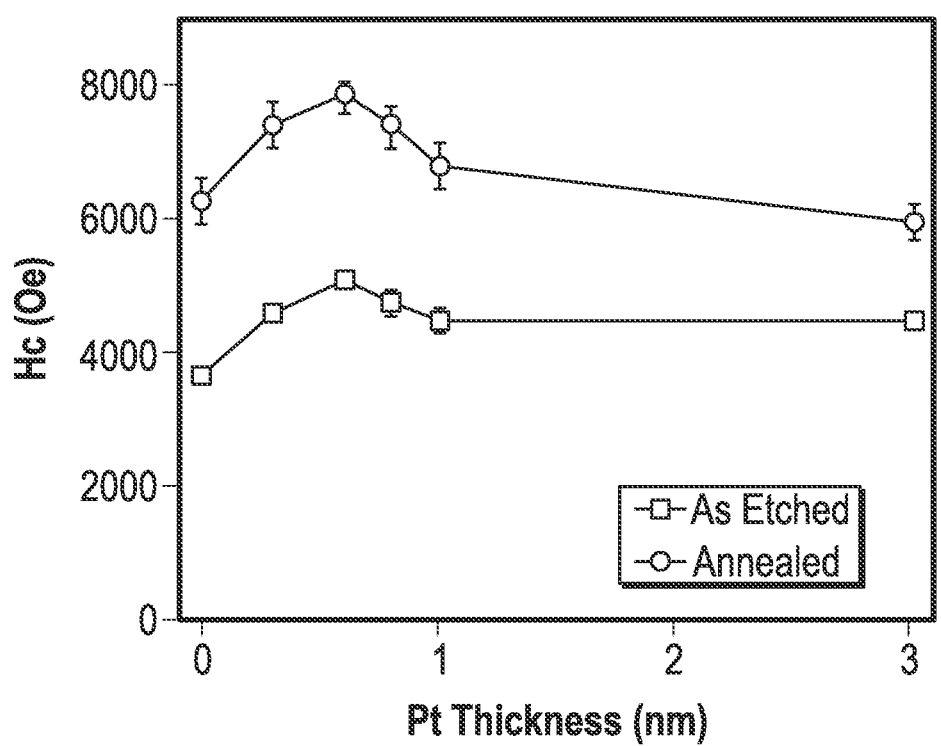
FIG. 9 is a graph of coercivity (Hc) as a function of Pt thickness for an as-etched bit-patterned media (BPM) disk with the NMF according to embodiments of the invention and for a BPM disk with the NMF according to embodiments of the invention after annealing.

The magnetic properties of BPM can be further enhanced by a post-etch in-vacuum annealing process, as described in US 20130270221 A1, which is assigned to the same assignee as this application. In one example of a BPM disk with the NMF/RL interface according to embodiments of the invention, as shown in the graph of FIG. 9, Hc increased from about 5.0 kOe to about 8.0 kOe for a 6 nm thick $CoPt_{10}Cr_{10}$ after in-vacuum annealing at temperature between 350-400° C. for 120 sec for Pt thicknesses less than 1.0 nm. With thicker Pt, the effect of annealing was found to be much less favorable in improving the magnetic properties of the RL, with Hc increasing by a few percent or even decreasing. It is believed that with a thicker NMF, the annealing leads to a change in the RL microstructure and significant inter-diffusion at the NMF/RL interface and therefore limits the improvement of the RL magnetic properties upon annealing. Thus embodiments of this invention with an ultrathin NMF less than or equal to 1.0 nm provide a significantly improved benefit from annealing.

Perpendicular magnetic recording disks with BPM have been proposed primarily for use in conventional magnetic recording, wherein an inductive write head alone writes data to the islands. However, perpendicular BPM disks have also been proposed for use in heat-assisted magnetic recording (HAMR). In a HAMR system, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the inductive write head. The improved BPM of this invention is also applicable to perpendicular BPM disks for HAMR disk drives.

Figure 10:
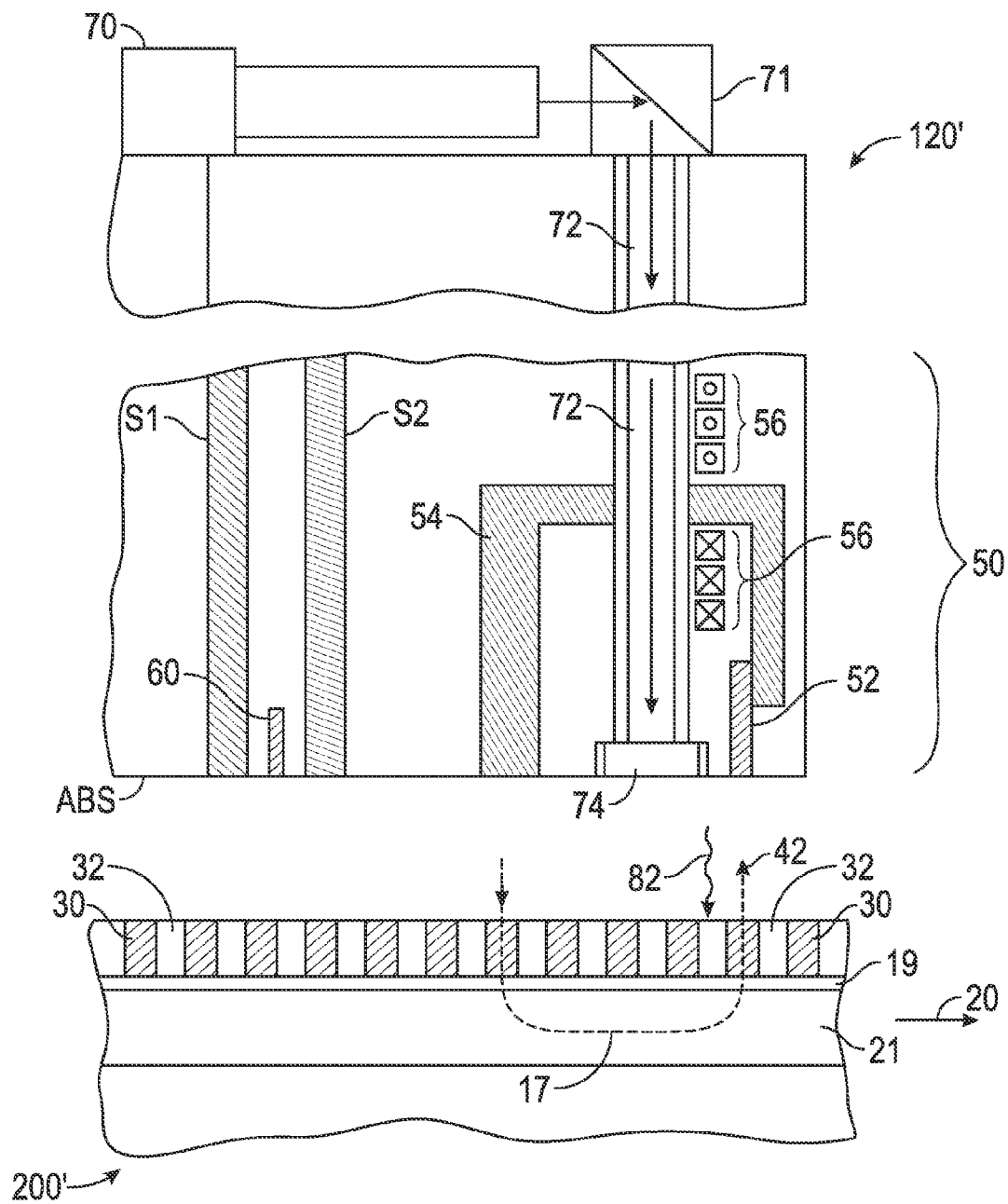
FIG. 10 is a sectional view of an air-bearing slider for use in a heat-assisted magnetic recording (HAMR) system and a portion of a HAMR disk with data islands according to an embodiment of the invention.

FIG. 1 thus depicts a conventional magnetic recording system with a perpendicular BPM disk 200 and an air-bearing slider 120 that supports the write head and read head. FIG. 10 depicts a sectional view, not drawn to scale because of the difficulty in showing the very small features, of an air-bearing slider 120' for use in a HAMR system and a portion of a HAMR disk 200'. The air-bearing slider 120' supports the write head 50 (with yoke 54 and write pole 52), read head 60, and shields S1 and S2. In the HAMR disk 200', a heat sink layer 21 is located below the islands 30 and nonmagnetic regions 32. The islands 30 may be islands according to this invention, like the island in FIG. 4. Heat sink layer 21 is formed of a material that is a good thermal conductor, like Cu, Au, Ag or other suitable metals or metal alloys. Layer 19 may be a thermal resist layer, such as a layer of MgO or $SiO_2$, between the heat sink layer 21 and the islands 30 to help control the heat flow so that heat is not distributed too rapidly into the heat sink layer 21. The HAMR disk 200' may also include an optional SUL, which if present would be located below the heat sink layer 21. If there is no SUL, then there is no need for an EBL. The slider 120' has an air-bearing surface (ABS) that faces the disk 200'. The slider 120' also supports a laser 70, mirror 71, optical waveguide or channel 72 and NFT 74, which has its output at the ABS.

When write-current is directed through coil 56, the write pole 52 directs magnetic flux to the data islands 30, as represented by arrow 80 directed to one of the data islands 30. The dashed line 17 with arrows shows the flux return path back to the return pole 54. The NFT 74 directs near-field radiation, as represented by wavy arrow 82, to the data islands 31 as the HAMR disk 10' moves in the direction 23 relative to the slider. The electric charge oscillations in the NFT heat the data islands 30 at the same time the data islands are exposed to the write field from the write pole 52. This raises the temperature of the magnetic recording material in the data islands to near or above its Curie temperature to thereby lower the coercivity of the material and enable the magnetization of the data island to be switched by the write field. When the data islands according to embodiments of this invention are used in a HAMR disk drive, the anisotropy field of the Co-alloy may be between about 15 and 100 kOe, which is considerably higher than the write field from a conventional write head. The composition of the Co-alloy layer may be varied to allow tuning of the Curie temperature.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned perpendicular magnetic recording medium comprising:
   a substrate;

a nonmagnetic Ru-containing underlayer on the substrate;
a perpendicular magnetic recording layer of an alloy comprising cobalt and platinum; and
a noble metal film between the Ru-containing layer and the magnetic recording layer, the noble metal film consisting of one or more of Pt, Pd, Rh, Ir and Au and having a thickness less than or equal to 3.0 nm; and
wherein the magnetic recording layer is patterned into a plurality of discrete islands.

2. The medium of claim 1 wherein the noble metal film has a thickness greater than or equal to 0.3 nm and less than or equal to 1.0 nm.

3. The medium of claim 1 wherein the noble metal film is a discontinuous film on the Ru-containing layer, whereby the magnetic recording layer is in contact with the Ru-containing layer and the noble metal film.

4. The medium of claim 1 wherein the noble metal film is located within the discrete islands.

5. The medium of claim 1 wherein the noble metal film is located in spaces between the discrete islands.

6. The medium of claim 1 wherein the noble metal film consists essentially of Pt.

7. The medium of claim 1 further comprising an oxide film between the Ru-containing underlayer and the magnetic recording layer, the oxide film comprising an oxide selected from a Ta-oxide, a Co-oxide and a Ti-oxide and having a thickness less than or equal to 1.5 nm.

8. The medium of claim 7 wherein the oxide film is located between and in contact with the noble metal film and the magnetic recording layer.

9. The medium of claim 1 wherein the magnetic recording layer comprises an oxide-free CoPtCr alloy having a hexagonal-close-packed (hcp) crystalline structure.

10. The disk of claim 1 further comprising a soft underlayer (SUL) of soft magnetically permeable material on the substrate below the Ru-containing layer, the SUL being formed of a material selected from the group consisting of alloys of CoFe, CoNiFe, NiFe, FeCoB, CoCuFe, FeAlSi, FeTaN, FeN, FeTaC, CoTaZr and CoZrNb.

11. The medium of claim 1 wherein the medium is a magnetic recording disk and wherein the islands are arranged on the substrate in a plurality of radially-spaced tracks.

12. A magnetic recording disk drive comprising:
the disk of claim 11;
a write head for magnetizing the perpendicular magnetic recording layer in the islands; and
a read head for reading the magnetized recording layer in the islands.

13. A heat-assisted magnetic recording (HAMR) disk drive comprising:
the disk of claim 11 further comprising a heat sink layer between the substrate and the islands;
a write head for applying a magnetic field to the perpendicular magnetic recording layer in the islands;
an optical data channel and near-field transducer for directing radiation to the islands to heat the perpendicular magnetic recording layer in the islands; and
a read head for reading the magnetized recording layer in the islands.

14. A bit-patterned media (BPM) perpendicular magnetic recording disk comprising:
a substrate;
a planarizing layer comprising on the substrate;
a soft underlayer (SUL) of soft magnetically permeable material on the planarizing layer;
a nonmagnetic Ru-containing underlayer on the SUL;
an oxide-free perpendicular magnetic recording layer of an alloy comprising cobalt and platinum and having a hexagonal-close-packed (hcp) crystalline structure with its c-axis substantially perpendicular to the plane of the recording layer; and
a noble metal film between and in contact with the Ru-containing layer and the magnetic recording layer, the noble metal film consisting of one or more of Pt, Pd, Rh, Ir and Au and having a thickness greater than or equal to 0.3 nm and less than or equal to 1.0 nm; and
wherein the perpendicular magnetic recording layer is patterned into a plurality of discrete islands arranged in a plurality of radially-spaced tracks.

15. The disk of claim 14 wherein the noble metal film is a discontinuous film on the Ru-containing layer, whereby the magnetic recording layer is in contact with the Ru-containing layer and the nonmagnetic film.

16. The disk of claim 14 wherein the noble metal film is located within the discrete islands.

17. The disk of claim 14 wherein the noble metal film consists essentially of Pt.

18. The disk of claim 14 further comprising an oxide film between the Ru-containing underlayer and the magnetic recording layer, the oxide film comprising an oxide selected from a Ta-oxide, a Co-oxide and a Ti-oxide and having a thickness less than or equal to 1.5 nm.

* * * * *